United States Patent [19]
Hilterhaus

[11] Patent Number: 5,107,928
[45] Date of Patent: Apr. 28, 1992

[54] ORGANOMINERAL PRODUCTS FROM AQUEOUS ALKALI METAL SILICATE, POLYISOCYANATE AND EPOXY RESIN

[76] Inventor: Karl-Heinz Hilterhaus, Schnellweg 21, 4520 Melle-Oberholsten, Fed. Rep. of Germany

[21] Appl. No.: 397,166

[22] Filed: Aug. 22, 1989

[51] Int. Cl.$^5$ .......................................... E21B 33/138
[52] U.S. Cl. .................... 166/293; 166/295; 405/263; 523/131; 528/27
[58] Field of Search ................ 525/528; 523/415, 131; 528/27; 405/264, 263; 165/295, 293

[56] References Cited

U.S. PATENT DOCUMENTS

| | | | |
|---|---|---|---|
| Re. 31,946 | 7/1985 | Meyer et al. | 405/264 |
| 3,763,070 | 10/1973 | Shearing | 525/528 |
| 4,321,184 | 3/1982 | Blount | 528/398 |
| 4,377,646 | 3/1983 | Blount | 528/51 |
| 4,669,919 | 6/1987 | Hilterhaus et al. | 405/264 |

FOREIGN PATENT DOCUMENTS

| | | | |
|---|---|---|---|
| 0193791 | 2/1986 | European Pat. Off. | |
| 2322184 | 8/1976 | France | |
| 56-78467 | 6/1981 | Japan | 523/415 |

Primary Examiner—John C. Bleutge
Assistant Examiner—Robert E. L. Sellers, II
Attorney, Agent, or Firm—Henry M. Feiereisen

[57] ABSTRACT

In the production of organomineral products which are used, in particular, within the scope of the process for stratum consolidation, it is a disadvantage that foams are, as a rule used which have inadequate strength and that, in addition, the hard polymer segments which are responsible for the strength of the organomineral products, do not contribute to the adhesion of the organomineral products, if they are used in situ for stratum consolidation. A process is disclosed for reacting organic polyisocyanates with epoxy resins in the presence of aqueous alkali-metal silicate solutions, the coreactants being used in an amount of substance ratio corresponding to the relationship

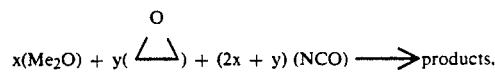

so that foaming of the reaction mixture is prevented and an organic polymer structure containing oxazolidinone ring structures is formed which bears adhesion-improving OH groups. The process is useful for stratum consolidation, stabilization and/or sealing of construction engineering works and bore holes, moulding and coating materials.

24 Claims, 1 Drawing Sheet

ORGANOMINERAL PRODUCTS FROM AQUEOUS ALKALI METAL SILICATE, POLYISOCYANATE AND EPOXY RESIN

The present invention relates to a process for producing organomineral products which are suitable, in particular, as stratum consolidation agents for coal, rock and/or ore in mining or tunnel construction, for which reason the process is carried out also preferably as a process for stratum consolidation in which the organomineral products are produced directly in situ in a stratum formation to be consolidated. Furthermore, according to the process, the material may be used in an artificial formation such as, for example, foundations, walls of reservoirs structures or in gas drillings and petroleum drillings to stabilise and/or seal against water and gas.

The process may furthermore also be used in an advantageous manner to consolidate and/or seal natural and/or artificial formations which are exposed to high-energy rich radiation.

Within the scope of the present invention, more or less homogeneous substances which are produced from a single reaction mixture and at the same time contain organic and inorganic constituents, preferably in the form of interconnecting networks of organic polymers and inorganic silicates which may possibly incorporate yet further organic and/or inorganic constituents, are described as organomineral products. Certain such organomineral products are at the same time already known from a number of publications of the prior art, and reference should be made in particular to FR-A-1,362,003, GB-A-1,186,771, DE-A-2,325,090, DE-A-2,460,834, DE-A3,421,086, US-A-4,042,536 and also EP-A-0,000,580.

In all the cases described, the organomineral products are produced from reaction mixtures which contain a polyisocyanate and an aqueous alkali-metal silicate solution ("water glass solution"). Additionally, modifiers, catalysts, stabilisers and various foaming agents are used to achieve particular properties in each case. To achieve as homogeneous properties as possible, particular attention is paid to the solubility or solvatability of the organic compounds used by water to produce finely divided emulsions. The disclosed applications of the organomineral products described extend from moulding compounds and insulating foams via cements and adhesive compounds to soil improvers and stratum consolidation agents.

Since one of the main applications of the process according to the invention is, within the scope of the present invention, stratum consolidation, it furthermore appears appropriate to portray in an introductory and summarizing manner the technical development in this specialist field in recent years. In this connection, the term "stratum consolidation" is understood to mean any process for consolidating and sealing geological and loose rock, earth and coal formations, the main emphasis being on stratum consolidation below ground in mines or in construction engineering. Such processes are known per se and in relation to the practical implementation, the process according to the invention also resembles the already known stratum consolidation processes, with the result that the prior art cited below should be consulted in relation to the possibilities of implementing the process for the purpose of supplementing the present disclosure.

Stratum consolidation is a special case of chemical soil consolidation in which coarse gravel, rock, coal or ore deposits are consolidated by injecting suitable liquid chemicals or are sealed against stagnant and flowing water or salt water. The first such processes were described as long ago as towards the end of the 19th century. At that time use was made, in particular, of water glasses in conjunction with hardeners. The water glasses are hardened in various ways. Thus, around 1925, H. Joosten used water glass and, in a subsequent injection, calcium chloride as hardener component. The process was further developed into the "monosol" process in which use was made of a single injection of considerably diluted water glass and sodium aluminate. In another process, the so-called "monodur" process, use was made of an emulsion of water glass and an organic acid as hardener component.

Around the middle of this century, the suitability of synthetic resins for the purpose of stratum consolidation began to be investigated, and in particular, first in the American hard coal mining. Since then, experiments have been carried out with injections of hardenable plastics based on polyesters, polyacrylates, epoxides and polyurethanes.

Thus, for example, in 1959, injection of epoxy resin with fillers was carried out. Further such processes which were carried out using synthetic resins with a purely organic base, and to be precise, based on polyurethanes in particular, are furthermore described in German Patents 1,758,185 and also 3,139,395.

Immediately the development of organomineral products started, the fundamental suitability of such products for soil and stratum consolidation was recognised. An early process of this type is described in German Patent Specification 1,069,878 dating from 1957 in which emulsions of water glass and polymerizable unsaturated esters are injected for the purpose of soil consolidation. GB-A-1,186,771 mentions the suitability of mixtures of water glass and polyisocyanate for sealing stratum formations in mining. DE-A-2,908,746 or the parallel EP-A-0,016,262 again discloses the use of such mixtures of water glass solutions and polyisocyanates for stratum consolidation and sealing, it being taught, however, that only the addition of polyoles to such mixtures results in a real consolidation in which stable formations are obtained.

DE-A-3,421,085 describes how mixtures of polyisocyanates and aqueous alkali-metal silicate solutions can be advantageously improved in stratum consolidation if a certain amount of a trimerization catalyst, which results in the build up of an organic network based purely on trimerized polyisocyanates, is added.

All the stratum consolidation processes hitherto known, however, have certain disadvantages which limit their applicability and reliability. In the case of the first injection processes for soil and stratum consolidation using purely inorganic materials, only unsatisfactory consolidations were obtained. This was probably due primarily to the unfavourable ratio of viscosity to solid-matter content in the water glasses used at that time and also to the fact that it was possible only inadequately to control the rate and extent of the hardening reaction. The effects of temperature, porosity and jointing of the soil or stratum formation, and also the occurrence of stagnant and flowing water influenced the results in a manner such that the effects obtained did not correspond to the intended results.

In the trials on a purely inorganic stratum consolidation, a number of undesirable side effects emerged such as inadequate strength of the formations due to extremely hydrous gels, brittleness due to incomplete or excessively crosslinking hardening reaction, leakage of the injection material into fairly large cavity regions or washing away by underground water-bearing beds.

It was completely impossible to carry out an injection through bore holes at an angle above the horizontal. The water glass hardeners used such as, for example, formamide and glyoxal, which were introduced into the ground formation in large quantities are today to be classified as environmentally unsafe.

Similar reservations also argue against numerous plastic-based injection materials which contain or release noxious substances. By way of example, mention may be made of phenols, formaldehyde, organic solvents and water-soluble foaming agents, and also chlorofluoro hydrocarbons. Out of the large number of conceivable plastic preparations for stratum consolidation and/or sealing by injection, only a few have therefore achieved practical significance. These include primarily polyurethanes synthetic resins such as those which are described in German Patents 1,758,185 and 3,139,395.

Again for material economy reasons, those formulations were preferably used in that case which foam under the given in situ conditions. In this case, a stated advantage of foaming formulations is, in particular, that the inflation pressure produced during foaming is capable of effecting a self-injection of the injection material, which makes it possible to operate with a lower injection pressure or simply to pour the injection material into the bore holes which are outwardly sealed. It had, however, already been recognised that it is a disadvantage per se that the strength of the hardened synthetic resin is reduced by the foaming.

Despite the widespread application of foaming formulations, foams must, however, be regarded as at least unfavourable if not even dangerous. The inflation pressure may in fact not only result in an advantageous self-injection of the injection material, but may also have adverse effects, namely if it accumulates behind fairly large beds and dislodges them. Owing to an inherent elasticity of synthetic resin foams, such foams furthermore yield during a pressure loading via the stratum, with the result that stratum movements are possible which lead to a fresh formation of stratum fissures. In addition, most foams exhibit a tough and elastic behaviour with which the conventional mining machines do not cope.

A further particular source of danger in using polyurethane reaction mixtures is the inadequate controllability of the reaction heat developed in situ at the working face. In the case of injections into fairly large stratum cavities spontaneous ignition of polyurethane mixtures may therefore occur. In particular, in coal mining and/or in mine openings containing an ignitable atmosphere, this is an as yet unsolved problem. In developing formulations therefore it is necessary to adopt the remedy that the heat of reaction which unavoidably develops can be released to the environment over a prolonged period of time. For this purpose, however, the formulations have to have a slow setting in relation to the reaction behaviour. However, this in turn imposes serious process-engineering problems on the user and impairs the reliability of the process. Injection formulations having long reaction times are in fact susceptible to the occurrence of side reactions, for example due to the absorption of water, as a result of which the reaction stoichiometry is displaced, with the result that the desired reaction product is not obtained. The fairly large quantities of $CO_2$ produced in the reaction with water build up a gas pressure which can result in the dislodging of stratum beds in laminar fissures and consequently counteracts the securing of strata which is aimed at. Slowly reacting formulations furthermore increase the risk of drainage from the stratum formation or infiltration into cavities, with substantial loss of injection material. Narrow fissure veins which require a higher injection pressure for penetration cannot, on the other hand, be reached.

For reasons of the type mentioned, narrow limits are imposed on the use of foaming polyurethanes for injection in coal mining, said use also being strictly regulated by official requirements.

Compared with pure polyurethanes, the organo-mineral products have produced substantial advances on being used as injection agents for stratum consolidation, but have also resulted in a number of new difficulties.

The important organomineral products for the scope of the present invention are obtained from polyisocyanates and aqueous alkali-metal silicate solutions. In such systems, isocyanate groups react with the involvement of the water to form low-molecular urea segments which, although they are extremely hard and able to support load, do not contribute to the adhesive action in relation to the rock strata. The $CO_2$ gas released simultaneously during the reaction reacts with the alkali-metal oxides ($Me_2O$, where $Me=Na$, K) present in the alkali-metal silicate solution to form carbonates and in doing so precipitates the silicate residue as a hydrous xerogel. In this uncontrolled decomposition of the alkali-metal silicate solution, its contribution to the adhesive action is lost. To improve the adhesion, polyol constituents are therefore also necessary in such reaction mixtures which follows, for example, from a comparison of Example 1 of DE-A-2,908,746 with the remaining examples. Additions of polyols to a reaction mixture of isocyanates in an aqueous alkaline medium are uncontrollable from a reaction kinetics point of view—particularly under the rugged conditions of mining—since, with a large excess of water, the water-induced isocyanate reaction is the main reaction. In such systems, polyoles therefore form only relatively short-chain organic molecular segments which exist in separated form in an inorganic matrix.

An attempt was therefore made to increase the contribution of the organic component at the expense of the inorganic component in systems of the type mentioned. An increase in the synthetic resin component results, however, in a worsening of the efficiency of the process.

According to DE-A-3,421-086, another route is therefore pursued by attempting to control the isocyanate reaction in alkali-metal silicate solutions by simultaneously using a suitable trimerization catalyst, while simultaneously taking account of the amounts of the reactants, in a manner such that a network is formed which is derived from the trimerization of the isocyanates. Although this actually imparts an extraordinarily high strength to the final product, it is in turn formed by hard organic molecular structures which, owing to the lack of suitable functional terminal groups, cannot bring about any adhesive effect, in particular on moist rock.

It is furthermore a disadvantage that the trimerization capacity of the catalyst is only fully utilised within narrow limits of the catalyst/isocyanate groups amount of substance ratio, while if the ratio drops below or exceeds the optimum, the normal isocyanate reaction with water is strongly activated, with the result that an undesirably large, non-adhesive urea component is produced. This formulatory limitation has, however, the process-engineering disadvantage that, in the case of an occasionally desirable high rate of reaction of the formulations, an uncontrolled foaming of the injection material which may lead to a product which is crushed to a light powder is observed.

A further problem which has not yet been satisfactorily solved is in the field of consolidating and/or sealing natural geological or artificial formations which are exposed to high-energy radiation. The vigorously promoted extension of nuclear energy in the last two decades and also the use of radioactive isotopes for a wide variety of industrial, medical and scientific investigation purposes resulted ever more frequently in the situation that materials emitting a high-energy radiation, in particular a radioactive radiation, have to be stored for substantial periods of time or temporarily or placed in a final repository.

The structural installations or above-ground or underground localities selected for these storage and repository purposes must at the same time have an exceptional high long-term stability and/or impermeability to gas and liquid exchange with the environment for safety reasons.

Apart from these increased safety requirements, however, in attempting an additional consolidation and/or sealing, an additional material problem arises owing to the fact that the high-energy or radioactive radiation originating from the material destroys numerous materials which would otherwise be suitable for consolidation and/or sealing. This applies, in particular, to most resins with an organic base.

In this connection, in particular, underground or above-ground final or intermediate repositories for radioactive material, structural installations of nuclear power stations, transport containers for radioactive material or cooling ponds and water containers in which radioactive material is stored are considered to be formations which have to be sealed.

It is therefore the object of the present invention to provide a process for producing new organo-mineral products based on polyisocyanates and aqueous alkali-metal silicate solutions, which process, while avoiding the process-engineering disadvantages mentioned in a reliable manner, yields unfoamed polymer organo-mineral products which are, on the one hand, hard but on the other hand, have a considerably improved adhesiveness compared a with comparable products, and which additionally have an improved resistance to high-energy radiation compared with organic resins. In this connection, on the one hand, the isocyanate reaction with water, which leads to the development of the inorganic silicate structure, should proceed unhindered, and on the other hand foaming should reliably be prevented.

This object is achieved by a process for producing organomineral products by reacting organic polyisocyanates with an aqueous alkali-metal silicate solution in the presence of an epoxy resin co-reactant wherein the heat produced by reactions involving the organic polyisocanate and water enable the formation of organic polymeric structures containing oxazolidinone rings.

This object is further attained according to the present invention by a process for stratum consolidation, comprising the steps of: injecting a liquid reaction mixture into crevices and cavities of a stratum and allowing it to react there with in situ formation of organo-mineral products, with the reaction mixture comprising organic polyisocyanates as a first polyisocyanate component and an aqueous alkali-metal silicate solution as a second alkali-metal silicate component, and with the reaction mixture further comprising as an additional co-reactant epoxy resin component, an epoxy resin which reacts in the presence of heat produced by reactions involving the polyisocyanate and water to form organic polymeric structures containing oxazolidinone rings as structural elements.

The above objective is also attained according to the present invention by a process for consolidating and/or sealing geological and/or artificial formations which are exposed to enhanced high-energy radiation, comprising the steps of injecting a reaction mixture via bore holes into the formation or coating the surface of the formation to be sealed with the reaction mixture, wherein the reaction mixture comprises organic polyisocyanates as a first polyisocyanate component, an aqueous alkali-metal silicate solution as a second alkali-metal silicate component, and as additional co-reactant epoxy resin component, an epoxy resin which reacts in the presence of heat produced by reactions involving the polyisocyanate and water to form organic polymeric structures containing oxazolidinone rings as structural elements.

The invention is explained in still further detail below on the basis of reactions which are important for the composition and the properties of the process product and also in relation to a more precise definition of possible starting products.

In a reaction mixture which contains, according to the present invention, polyisocyanates (R—NCO), an aqueous alkali-metal silicate solution ($H_2O$, $Me_2O \times nSiO_2$) and also an epoxy resin the main reactions listed in the formula diagram below proceed during the process according to the invention. In this connection, it should, however, also be pointed out that, in accordance with the fact that the isocyanates are predominantly difunctional and higher-functional polyisocyanates and mixtures thereof and the epoxy resins as a rule also contain at least two epoxy groups, the radicals R (isocyanate) and R' (epoxy resin) have further centres which are able to react in the sense of the formula diagram below. This means, however, that the reaction products obtained, which, in the formula diagram below, still have such radicals, are in fact parts of high-polymer organic structures.

The product forming reactions are:

-continued

2.

3.

4.

5.

6.

The reactions shown diagrammatically in these formulae are interconnected in carrying out the process according to the invention for producing organomineral products as follows: reaction 1 is the usual, known reaction of isocyanates with water. Within the scope of the present reaction, this reaction is of great significance as a $CO_2$ and heat-yielding reaction. The amine formed in this reaction reacts in a known manner in reaction 2 to form urea structures which yields a first portion of solids to be found later in the reaction product. In addition, said reaction 2 yields further heat. For the process according to the invention, the urea units formed at this stage are less important than the heat produced. For while the $CO_2$ in reaction 3 reacts in a known manner to form a silicate structure containing the alkali-metal oxide component of the alkali-metal silicate, that is to say, it is bound, the heat produced in reactions 1 and 2 makes possible the reaction of isocyanate groups which have not yet reacted with water with the epoxy resin present in the reaction mixture, with opening of the oxirane ring and formation of polyoxazolidinones which form a high-polymer organic supporting structure.

In this connection it should be pointed out at this point that in reactions 1 and 2, 2 mol of R—NCO (=2 ×mol) are used to produce 1 mol of $CO_2$. Since this $CO_2$ should be bound completely by the reaction mixture to prevent foaming, for reasons of reaction stoichiometry, isocyanate groups and $Me_2O$ molecules must be present in an amount of substance ratio of 2 : 1.

Since equimolar amounts of isocyanate and epoxy groups react with one another in reaction 4, a further additional portion of isocyanate groups (y) is necessary for this reaction.

In addition to the network-forming basic reactions 1 to 4, two further reactions are however of exceptional importance for the properties of the products produced in the process according to the invention. Since the epoxy resins or the polymers formed therefrom in the reaction inevitably contain a certain proportion of functional hydroxyl groups, urethane segments, which are diagrammatically represented in formula 5 by the bracketed expression, are formed in the reaction mixture as intermediately produced byproducts. The epoxy resins are also able to react with such urethane segments to form oxazolidinone, it being of significance that organic products containing free hydroxyl groups (R''—OH) are formed in this process.

These hydroxyl compounds are also able to react with epoxy units of the epoxy resins present, organic structures containing free hydroxyl groups being formed (reaction 6).

In the process according to the invention, segments containing hydroxyl groups are consequently inevitably formed as products of the side reactions in the polymer chains produced. Said hydroxyl groups are, however, exceptionally important for the properties of the products obtained since they have the effect that the organic polymer structure formed also has adhesive properties, it being possible for hydrogen bonds to the oxygen functions situated at the surface of the rock material to form, and in particular, in accordance with the following diagrammatic representation:

In contrast to the known processes in which the organic polymer structure does not develop any adhesive effect, in the process according to the invention, an adhesive polymer structure is formed which, in addition to the inorganic silicate structure, contributes to the improvement in adhesion between rock and synthetic resin. If, in the formulation according to the invention, care is taken that the amount of alkali-metal oxide necessary to bond the $CO_2$ developed is always present, foaming is avoided.

That the excess isocyanate groups do in fact react with the epoxy and not with excess water is ensured by the heat produced in the basic reactions in which, in addition, suitable catalysts as a rule also take on an important control function. Suitable catalysts may be amine-based catalysts, in particular based on tertiary amines or quaternary ammonium salts, catalysts in the form of organometallic compounds or catalysts in the form of inorganic salts. In this connection it should be pointed out that, within the scope of the process according to the invention, amine catalysts such as 2,4,6-tris(-dimethylammomethyl)phenol or even benzyldimethylamine clearly catalyse preferably the isocyanate/epoxide reaction, whereas they act as trimerization catalysts in the absence of epoxides (cf. DE-A-3,421,086). Inorganic salts, in particular $FeCl_3$, $AlCl_3$ or $ZnCl_2$, activate, in particular, the epoxy groups to react with NCO groups, but inhibit the reaction between isocyanate and OH groups. Such compounds are therefore contained in effective amounts in technical isocyanates as inhibitors which are identified in the specifications as hydrolysable chlorine or as total chlorine. The fact that such salts which act catalytically within the scope of the process according to the invention are in any case contained in technical polyisocyanates has the additional advantage that in many cases it is possible to dispense with the separate addition of a further catalyst.

Organometallic compounds, for example triisopropyl aluminium Al(i-C$_3$H$_7$)$_3$, are suitable catalysts for the process according to the invention and as a result of their specific selection, reaction mixtures having the desired properties for the particular application can be obtained. In addition to the stoichiometry which can be calculated according to the invention, catalysts concomitantly contribute to reliably controlling the per se very complex epoxy resin/water glass/polyisocyanate reaction system.

In this connection, it is the objective of any development of a formulation for carrying out the process according to the invention to create the following preconditions by varying the amount and type of the catalyst or catalyst system and also the coreactants:

1. The isocyanate/water reaction must proceed only as far as the CO$_2$ gas produced in the process can be absorbed by the total formulation.

2. The exothermic heat formed in this starting reaction and the catalyst activating the oxazolidinone formation must be matched to each other in a manner such that polymer structures with an organic base are produced even in aqueous alkaline systems.

In order to fulfil precondition no. 1 care should be taken that the ratio of the coreactant satisfies the condition that the organomineral products are produced in the form of solid, unfoamed products and the coreactants polyisocyanate, aqueous alkali-metal silicate solution and epoxy resin, involved in the reaction, are used in such amount of substance ratios that the following relationship is fulfilled:

where x(Me$_2$O) is the amount of substance in mol of sodium and/or potassium oxide in the alkali-metal silicate used, is the amount of substance in mol of the epoxy groups in the epoxy resin used, (2x+y)(NCO) is the amount of substance of the —NCO groups in mol in the polyisocyanate used, where Me stands for Na or K and x and y are positive numbers expressing the respective relative molar amounts, which positive numbers have a tolerance width which allows for the usual quality variations in the individual coreactants if these are used as technical commercial products, and where the epoxy resin is used in an amount which is from 0.01 to 60 % by weight, based on the weight of the alkali-metal silicate solution used.

The correct ratio of isocyanate groups to epoxy groups in the reaction mixture and also, matched thereto, the effectiveness of the catalyst which activates the reaction 4 ensures the maintenance of the above precondition no. 2.

Preferably, reaction mixtures are prepared from starting substances which fulfil the following conditions:

| | |
|---|---|
| NCO groups (from the polyisocyanate | 0.238–1.19 mol per 100 g |
| Me$_2$O (from alkali-metal silicate solution) | 0.081–0.323 mol per 100 g |
| Epoxy units (oxirane rings; from epoxy resin) | 0.020–0.80 mol per 100 g |

Preferably such amounts of alkali-metal silicate solution and epoxy resin are used that the alkali-metal silicate solution and the epoxy resin, which in accordance with one embodiment, is used in the form of a preliminary mixture described as "component A", are present in a preliminary mixture containing only these two constituents in amounts of 70 to 95% by weight of alkali-metal silicate solution and 5 to 30% by weight of epoxy resin. These amounts correspond to a content of Me$_2$O of 0.09 to 0.28 mol per 100 g or of 15 to 210 mmol of epoxy groups per 100 g respectively.

From these data, a preferred range for the ratio x/y of 0.4 to 18.6 may be deduced.

Since the process is normally carried out with starting products of technical quality, natural tolerances furthermore arise for the amounts of substance of the above coreactants within the scope of the specified amount of substance ratio due to the normal product variations. On the basis of the quality variations which can at present be found in practice, approximately the following tolerances are valid in this connection:

Allowing for the various possible water glass and epoxy resin qualities which may be used in the process according to the invention, if further emerges that the epoxy resin maybe present in a reaction mixture for the process according to the invention in a proportion of 0.01 to 60% by weight, based on the weight of the water glass solution used.

As already indicated, the normal polyisocyanate and aqueous alkali-metal silicate solutions used hitherto in such processes can be used in the process according to the invention.

In this connection, the polyisocyanates are pure or technical grade polyisocyanates, in particular solvent-free 4,4'-diphenylmethane diisocyanate mixed with higher-functional isocyanates such as those marketed by various manufacturers and described as crude MDI. However, so-called prepolymers which still contain reactive NCO groups, may also be used. Such products are obtained by reacting polyisocyanates with organic compounds which contain at least one, preferably, however, two or more hydrogen atoms which are active with respect to NCO groups. Such prepolymers are known to the polyurethane chemist. According to the invention, however, the use of a prepolymer is claimed which is produced from a monoisocyanate and a resin contain epoxy rings according to claim. In this case, NCO groups are reacted in stoichiometric or excess amount with the OH groups unavoidably produced in the production of the resin containing epoxy groups, a prepolymer being produced which is free of OH groups. This prepolymer remains stable on storage for months. In addition, it may be added (see Example 10) to the technical isocyanate which normally contains a catalyst activating the oxazolidinone formation, adequate storage stability also further being obtained for this component.

The aqueous alkali-metal silicate solutions used may be sodium and/or potassium water glasses, and also mixtures thereof having a dissolved solid-matter content of 10 to 60% by weight, in particular of 35 to 55% by weight, and a content of alkali-metal oxide of 5 to 20% by weight, in particular 8 to 18% by weight. In relation to their utilisation according to the invention, the water glasses situated in this range exhibit good process-engineering properties such as flowability, satisfactorily usable reaction-kinetic properties such as a specific heat range and general physiological and environmental safety.

In addition, they bridge the range which, depending on formulation, yields a final product with a high or low water content, it being possible, surprisingly, to consider the product with low water content, as in Example 9, as impermeable to gas with a value of <1 mD (millidarcy).

The epoxy resins used may be epoxy resins known per se which have a content of functional epoxy groups in a wide range from 200 to 8000 mmol/kg, preferably in the range from 300 to 700 mmol/kg. Such resins include, in particular, epoxy resins based on a modified bisphenol A or based on dimeric fatty acids or standard bisphenol A epoxy resins. Such resins contain at least two epoxy groups, it being possible, however, for monoepoxides also to be added. More highly functional epoxy resins may, however, also be used, for example epoxy resins with a phenol/novolak base.

According to the process according to the invention, two mixing methods can preferably be employed. According to the first mixing method, an A component is produced from material containing epoxy groups with the alkali-metal silicate solution and this is subsequently reacted with the calculated amount of B component. If a technical grade polyisocyanate is used as B component, a catalyst which activates the oxazolidinone reaction has already been added. Additionally, other catalysts of the type according to the invention may also be added to the B component. According to the second method, the A component is composed solely of an alkali-metal silicate solution according to the invention and possibly a catalyst. The B component is in this case composed of the polyisocyanate and the material containing epoxy groups. Preferably use is made in this case of the polyepoxide described above which is "inertised" by monoisocyanates. With appropriate inertness towards the A and B components, further additives may be added to achieve particular properties. In this connection, mention may be made of fillers such as, for example, dispersed silicic acids, diatomaceous earth, natural and synthetic fibres of various length, soots producing electrical conduction, dyestuffs, hollow microspheres, fly ash, sand, quartz flour etc.

If the process according to the invention is carried out as a process for stratum consolidation, a reaction mixture of the desired viscosity is prepared in a manner known per se which are by mixing the coreactants in the above specified sense and this reaction mixture is immediately injected under pressure into the stratum to be consolidated, it being possible to resort to techniques known per se which are described in the prior art cited in the introduction. Since the products according to the invention are not foams, self-injection processes (pouring into a bore hole and simple sealing) are excluded.

The materials which can be prepared according to this teaching may be versatilely used by varying inorganic to organic polymer proportion since important polymer properties such as, for example, modulus of elasticity and compressive strength, can be adjusted in wide ranges.

Thus, formulations containing a high silicate proportion are stone-like materials, and formulations containing a high organic proportion have, on the other hand, typical properties of polymer materials.

Owing to their reaction behaviour, the components may be injected into open and/or closed moulds so that castings or panels, rods, frames, models, machine components etc. can be produced therefrom.

The spraying onto dry and/or moist subsoils using two-component spray guns is feasible owing to the possibility of chemical anchorage to the substrate. Unprotected steel may be provided in this way, for example, with a corrosion protection. Damaged prestressed concrete structures may be improved by injection with the new materials not only in their statics, but they simultaneously acquire a corrosion protection which is also able to neutralise acid waste waters owing to the buffer salts incorporated.

The organomineral products produced by the process according to the invention have the advantages that they do not have a foam structure which would make a gastight sealing difficult or prevent it, and that initial investigations have shown that the organomineral products containing chain segments extended with epoxy groups are extremely stable when exposed to high-energy radiation. The good adhesive strength on stone remains intact and no release of gases or vapours occurs.

These properties distinguish the preferred organomineral products advantageously from those such as are used according to EP-A-0,016,262 in coal mining or as are described according to DE-A-3,421,085. These publications describe products which exhibit, as a rule, a foam structure and release water vapour and also blowing agent (chlorofluorohydrocarbons) during their production, which prevents a perfect gastight seal. The polyurethane segments present in these materials are sensitive to an exposure to high-energy radiation (presumably in a similar manner to polyamides) and are decomposed by such radiation. At least for the purpose of sealing and/or consolidating long-term repositories, such materials are, as a rule, therefore not suitable. Owing to their solid nature and to the organic components which are—so far as is hitherto known—insensitive to high-energy radiation, on the other hand, the organomineral products produced from the three-component reaction system of the process according to the invention are eminently suitable for the purposes described.

For the claimed use, the organomineral products in the form of their initial reaction mixtures are either injected via bore holes into the formations to be consolidated, as is known from the known applications of such organomineral products, for example, in coal mining, or they are alternatively or additionally applied laminarly to the surface regions to be sealed of the formation to be sealed for the purpose of sealing, after which the completion of the reaction with the formation of the organomineral products is awaited in each case or, if applicable, the environmental conditions favourable therefor are produced.

The invention is explained in more detail below with reference to exemplary embodiments which relate to the selected reaction mixtures for implementing the process according to the invention and also comparison mixtures.

EXAMPLES 1 to 10

In the following examples 1 to 10, the starting materials to be found in Table 1 below are used, it being indicated at the same time which components were used to prepare the reaction mixture jointly in the form of a component A or component B.

TABLE 1*

| Starting materials | 1 A | 1 B | 2 A | 2 B | 3 A | 3 B | 4 A | 4 B | 5 A | 5 B | 6 A | 6 B | 7 A | 7 B | 8 A | 8 B | 9 A | 9 B | 10 A | 10 B |
|---|---|---|---|---|---|---|---|---|---|---|---|---|---|---|---|---|---|---|---|---|
| Water glass 1 | 80.0 | | | | | | | | | | | | 49.25 | | | | | | | |
| Water glass 2 | | | 84.15 | | 84.15 | | | | | | | | | 50.25 | 95 | | 90 | | | |
| Water glass 3 | | | | | | | 70 | | | | | | | | | | | | | |
| Water glass 4 | | | | | | | | | 95 | | | | | | | | | | | |
| Water glass 5 | | | | | | | | | | | | | | | | | | | 88 | |
| Water glass 6 | | | | | | | | 100 | | | | | | | | | | | | |
| Epoxide 1 | 20.0 | | | 2.50 | | | 10 | | | | | | | 6.175 | | 10 | | | | |
| Epoxide 2 | | | | | | | | | 30 | | 5 | | | | | | | | 10 | |
| Epoxide 3 | | | | | | 2.50 | | | | | | | | | | | | | | |
| Epoxide 4 | | | | | | | | | | | | | | | 5 | | | | | |
| R—NCO-1 | | 55.22 | | 52.43 | | | | 54.64 | | 36.46 | | 76.30 | | 56.04 | | 60.88 | | 60.92 | | 25.5 |
| R—NCO-2 | | | | | | | | | | | | | | 0.325 | | | | | | |
| Catalyst-1 | 0.5 | | | | | | 0.5 | | 0.5 | | 0.5 | | | | | 0.8 | | | 0.5 | |
| Catalyst-2 | | 0.5 | 0.5 | | | | | | | | | | 0.5 | | | | | | | |
| Catalyst-3 | | | | | | 0.50 | | | | | | | | | | | | | | |
| Catalyst-4 | | | | | | | | | | | | | | | | | 1.0 | | | |
| Stabilizer-1 | 1.0 | | 1.0 | | 1.0 | | 1.0 | | 1.0 | | 1.0 | | 1.5 | | 1.6 | | | | 1.5 | |
| Stabilizer-2 | | | | | | | | | | | | | | | | | 2.0 | | | |
| Filler | | | | | | | | | | | | | | | | | | | 5 | |

*Amounts of starting materials specified in parts by weight

In the following examples, the alkali-metal silicate solutions, the epoxy resins, the polyisocyanates, the catalysts, the stabilizers and the filler are denoted by abbreviated descriptions which conceal the products to be found in the following table:

| Starting materials: | % by weight of Me₂O | % by weight of the total solid matter | Me |
|---|---|---|---|
| Water glass 1: | 12.0 | 45.0 | Na |
| Water glass 2: | 13.8 | 47.0 | Na |
| Water glass 3: | 8.8 | 38.0 | Na |
| Water glass 4: | 18.0 | 54.5 | Na |
| Water glass 5: | 5.8 | 28.1 | Na |
| Water glass 6: | 13.5 | 40.5 | K |

| | Type | mmol Epoxide / kg |
|---|---|---|
| Epoxide 1 | Mod. Bisphenol A | 4.650–5.130 |
| 2 | Dimeric fatty acid basis | 2.130–2.560 |
| 3 | Bisphenol A standard | 5.150–5.550 |
| 4 | Phenol novolak | 5.260 |
| R—NCO-1 | Diphenylmethane 4,4'-diisocyanate Free NCO content 31 ± 1% by weight Hydrolysable chlorine 0.1–0.45% | |
| R—NCO-2 | Phenyl isocyanate, technically pure | |
| Catalyst 1 | Dimethylbenzylamine | |
| Catalyst 2 | 2,4,6-trisdimethylaminomethylphenol | |
| Catalyst 3 | Dioctyltin mercaptide | |
| Catalyst 4 | Aluminium isopropylate, purity >98% | |
| Stabilizer-1 | Silicone/glycol copolymer with no free OH groups | |
| Stabilizer-2 | Silicone copolymer having a hydroxyl number of 30 ± 5 (mgKOH/g) | |
| Filler | Dispersed silicic acid | |

EXAMPLE 1

The A and B components are mixed with one another in the specified mixing ratio until a whitish emulsion is produced.

The start of the reaction is indicated by an increase in viscosity and a liberation of heat.

The course of the reaction can be followed using a Shore hardness test apparatus:

| Min. | Shore hardness |
|---|---|
| 5 | 20 D |
| 15 | 30 D |
| 30 | 40 D |
| 60 | 45 D |

The reaction produces a bright yellow, non-foaming but also non-shrinking material.

EXAMPLE 1a

Comparison

If the proportion of the B component from Example 1 is reduced by 50%, a hydrous xerogel is obtained which undergoes severe shrinkage and has low strength.

EXAMPLE 2

The A and B components are mixed with one another in the specified mixing ratio until a whitish emulsion is produced.

The start of the reaction is indicated by an increase in viscosity and the liberation of heat.

The course of the reaction can be followed using a Shore hardness test apparatus:

| Min. | Shore hardness |
|---|---|
| 5 | yield point |
| 15 | 74 A |
| 17 | 90 A |
| 45 | 40 D |

The reaction produces a bright yellow, non-foaming, but also non-shrinking material.

EXAMPLE 3

The A and B components are mixed with one another in the specified mixing ratio until a whitish emulsion is produced.

The start of the reaction is indicated by an increase in viscosity and the liberation of heat.

The course of the reaction can be followed using a Shore hardness test apparatus:

| Min. | Shore hardness |
|---|---|
| 1 | yield point |
| 2 | 95 A |
| 3 | 50 D |
| 4 | 55 D |
| 5 | 60 D |

The reaction produces a bright yellow, non-foaming, but also non-shrinking material.

EXAMPLE 4

The A and B components are mixed with one another in the specified mixing ratio until a whitish emulsion is produced.

The start of the reaction is indicated by an increase in the viscosity and the liberation of heat.

The course of the reaction can be followed using a Shore hardness test apparatus:

| Min. | Shore hardness |
|---|---|
| 4 | 15 A |
| 5 | 65 A |
| 5 30" | 20 D |
| 6 | 30 D |

The reaction produces a bright yellow, non-foaming, but, also non-shrinking material.

EXAMPLE 4a

Comparison

If the proportion of polyisocyanate from Example 4 is reduced by approx 30% by weight, a severely shrinking xerogel is produced which hardens after giving off water.

EXAMPLE 5

The A and B components are mixed with one another in the specified mixing ratio until a whitish emulsion is produced.

The start of the reaction is indicated by an increase in viscosity and the liberation of heat.

The course of the reaction can be followed using a Shore hardness test apparatus

| Min. | Shore hardness |
|---|---|
| 3 30" | yield point |
| 10 | 30 D |
| 15 | 40 D |
| 30 | 45 D |
| 1 d | 50 D |

The reaction produces a bright yellow, non-foaming, but also non-shrinking material.

EXAMPLE 5a

Comparison

If the proportion of polyisocyanate in Example 5 is reduced by approx. 15% by weight, a material is produced which, although it shrinks little, is relatively soft and which has a Shore hardness of 10 A after 20 minutes and a Shore hardness of 35 D after one day.

EXAMPLE 6

The A and B components are mixed with one another in the specified mixing ratio until a whitish emulsion is produced.

The start of the reaction is indicated by an increase in viscosity and the liberation of heat.

The course of the reaction can be followd using a Shore hardness test apparatus.

Figure 1:
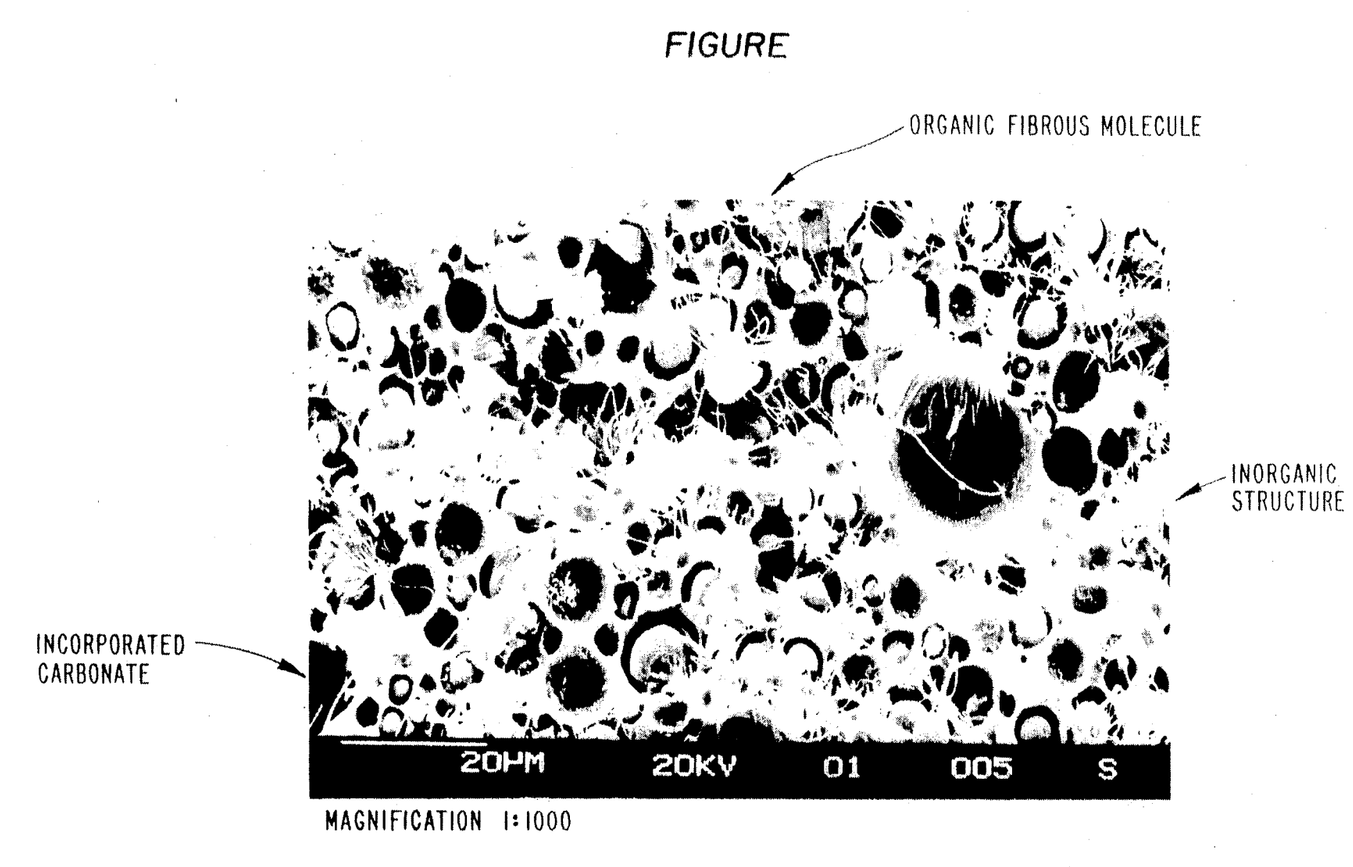
FIG. 1 shows a microphotograph of a product produced by the process according to the invention (magnification 1:1000).

A very solid, bright yellow resin containing a low proportion of water with a simultaneously high inorganic proportion is produced. The figure shows a microphotograph of a fracture plane of the material obtained in this example at a magnification of 1 : 1000.

EXAMPLE 7

Holes having a diameter of 50 mm and a depth of 900 mm were drilled in a block of concrete. A steel hollow anchor was pushed into the bore hole and centred by a means of a bore hole closure and secured. The bore hole was press-moulded with the injection material according to Example 7 via the hollow anchor using a high-pressure injection machine.

After 30 min., the extraction force of the anchor was tested using a hydraulic pulling apparatus. The anchor (dia. 30 mm) could not be pulled out. On increasing the hydraulic force, the anchor head finally fractured.

EXAMPLE 8

The A and B components are mixed with one another in the specified mixing ratio until a whitish emulsion is produced.

The start of the reaction is indicated by an increase in viscosity and the liberation of heat.

The course of the reaction can be followed with a Shore hardness test apparatus:

| Min. | Shore hardness |
|---|---|
| 45 | yield point |
| 1 | 65 D |

A very solid, bright yellow resin is produced which neither shrinks nor foams.

EXAMPLE 9

The A and B components are mixed with one another in the specified mixing ratio until a whitish emulsion is produced.

The beginning of the reaction is indicated by an increase in viscosity and the liberation of heat.

The course of the reaction can be followed using a Shore hardness test apparatus:

| Min. | Shore hardness |
|------|----------------|
| 5    | yield point    |
| 20   | 25 A           |
| 25   | 15 D           |
| 30   | 20 D           |
| 60   | 55 D           |

A very solid, bright yellow resin is produced which neither shrinks nor foams.

EXAMPLE 10

The A and B components are mixed with one another in the specified mixing ratio until a whitish emulsion is produced.

The start of the reaction is indicated by an increase in viscosity and the liberation of heat.

After the reaction, a material is produced having a high proportion of silicic acid and high gas permeation.

Subsequently, it is demonstrated with reference to comparison examples that with process conditions which do not meet the requirements of the process according to the invention, inferior or completely unusable organo-mineral products are produced.

TABLE 2

| Starting materials* | Comparison examples | | | | | |
|---|---|---|---|---|---|---|
| | 1 | | 2 | | 3 | |
| | Comp. A | Comp. B | Comp. A | Comp. B | Comp. A | Comp. B |
| Demin. water, $CO_2$-free | 53.00 | | 65.50 | | 25.00 | |
| Water glass 1 | | | | | 25.00 | |
| NaOH | | | 17.82 | | | |
| Polyisocyanate-31 | | 60.30 | | 60.30 | | 30.15 |
| Catalyst 1 | | 0.50 | | 0.50 | | 0.25 |
| Polysiloxane 1 | | 1.00 | | 1.00 | | 0.50 |

*The amounts of the starting substances are specified in parts by weight

COMPARISON EXAMPLE 1

In a stirred vessel, the components A+B, which are introduced in sequence are mixed until an emulsion is produced. After approx. 1 minute of stirring time, the material starts to react—which can be recognised from the evolution of heat. At the same time, a light, bright yellow foam without usable strength is produced.

COMPARISON EXAMPLE 2

In a stirred vessel, the components A+B, which are introduced in sequence, are mixed until an emulsion is produced. After less than one minute of stirring time, the material begins to react—which can be recognised from the evolution of heat. An unfoamed material is produced which is composed of hydrous granules. The original pH of the reaction mixture of 14 has fallen after the reaction to a value of 9–10.

COMPARISON EXAMPLE 3

In a stirred vessel, components A +B, which are introduced in sequence are mixed until an emulsion is produced. After about 1 minute of stirring time, the material begins to react—which can be recognised from the evolution of heat, and at first an unfoamed product is produced which, however, develops into a bright yellow foam in the second reaction phase. At the end of the reaction time, the brittle foam is partially ruptured by the sudden escape of $CO_2$ and water vapour from the interior.

I claim:

1. Process for stratum consolidation, comprising the step of
   injecting a liquid reaction mixture into crevices and cavities of a stratum and allowing it to react there with in situ formation of organo-mineral products, with the reaction mixture comprising
   (i) organic polyisocyanates as a first polyisocyanate component,
   (ii) an aqueous alkali-metal silicate solution as a second alkli-metal silicate component, said alkali-metal silicate solution containing a dissolved matter-content in the range of from 10 to 60% by weight and an $Me_2O$ content of 5.0 to 20% by weight, wherein $Me_2O$ represents an alkali-metal oxide selected from the group consisting of sodium oxide, potassium oxide and mixtures thereof, and
   (iii) as an additional co-reactant epoxy resin component, an epoxy resin which has a content of functional epoxy groups of 200 to 8000 nmol/kg and which reacts in the presence of heat produced by reactions involving the polyisocyanate and water to form organic polymeric structures containing oxazolidinone rings as structural elements.

2. Process according to claim 1 wherein the orgnao-mineral products are formed as solid, unfoamed products, with the components of the liquid reaction mixture being used in such amount of substance ratios that the following relationship is fulfilled:

wherein $x(Me_2O)$ is the amount of substance in mol of an alkali-metal oxide selected from the group consisting of sodium oxide, potassium oxide and mixtures thereof in the alkali-metal silicate component, is the amount of substance in mol of the epoxy groups in the epoxy resin component, $(2x+y)$ (NCO) is the amount of substance in mol of the —NCO groups in the polyisocyanate component, and wherein Me stands for Na, K or mixtures thereof and x and y are positive numbers expressing the respective molar amounts, which numbers have a tolerance width which allows for the normal quality variations in the individual components if these are used as commercial products of technical grade, and wherein the epoxy resin component is used in an amount which is from 0.01 to 60% by weight, based on the weight of the alkali-metal silicate component.

3. Process according to claim 2 wherein the polyisocanate component comprises a polyisocyanate whose content of NOC groups is in the range from 0.238 to 1.190 mol per 100 g of polyisocyanate, wherein, further, as alkali-metal silicate component an aqueous alkali-metal silicate solution is used which is such that the content of Me$_2$O, with Me representing Na, K or mixtures thereof, is in the range from 0.081 to 0.323 mol per 100 g of alkali-metal silicate solution, and wherein as epoxy resin component an epoxy resin is used whose content of functional epoxy groups is in the range from 0.020 to 0.800 mol per 100 g of epoxy resin.

4. Process according to one of the claims 1 or 2, wherein as polyisocyanate component a chemically pure polyisocyanate or a polyisocanate of technical grade or a mixture of any such polyisocyanates with organic monoisocyanates is used, with the content of free NCO groups in the polyisocyanate component ranging from 10 to 50% by weight.

5. Process according to claim 4 wherein the content of free NCO groups in the polyisocyanate component ranges from 25 to 35% by weight.

6. Process according to one of the claims 1 or 2 wherein the reaction mixture further comprises a catalyst promoting the oxazolidinone formation.

7. Process according to claim 6 wherein the reaction mixture further comprises one or more components selected from the groups consisting of stabilizers, filers and mixtures thereof.

8. Process according to claim 6 wherein the catalyst is selected from catalysts based on tertiary amines, catalysts in form of organometallic compounds or catalysts in form of inorganic salts.

9. Process according to claim 6 wherein the catalyst is selected from the group consisting of benzyldimethylamine, 2,4,6-tris(dimethylaminomethyl)phenol, tetraethylammonium bromide, dioctyltin mercaptide, aluminum triisopropylate, alumin trichloride, zinc dichloride and iron trichloride.

10. Process according to one of the claims 1 or 2 wherein the reaction mixture further comprises one or more components selected from the group consisting of stabilizers, fillers and mixtures thereof.

11. Process according to one of the claims 1 or 2 wherein the final reaction mixture is prepared by mixing the aqueous alkali-metal silicate solution and the epoxy resin to form a first premix component (component A$_1$), and by subsequently mixing the first premix component with a second premix component comprising the polyisocyanate and, optionally, the catalyst.

12. Process according to one of the claims 1 or 2 wherein the final reaction mixture is prepared by mixing a first premix component comprising the aqueous alkali-metal silicate solution and, optionally, the catalyst (component A$_2$) with a second premix component (component B) comprising the polyisocyanate and the epoxy resin, with the epoxy resin being completely free of OH groups and obtained by reacting the epoxy resin in a preliminary reaction with a monoisocyanate at an amount corresponding to the stoichiometric amount of the OH groups in the epoxy resin.

13. A process for consolidating and/or sealing geological and/or artificial formations which are exposed to enhanced high-energy radiation, comprising the steps of injecting a reaction mixture via bore holes into the formation or coating the surface of the formation to be sealed with the reaction mixture, wherein the reaction mixture comprises (i) organic polyisocyanates as a first polyisocyanate component,

(ii) an aqueous alkali-metal silicate solution as a second alkali-metal silicate component, said alkali-metal silicate solution containing a dissolved matter-content in the range of from 10 to 60% by weight and an Me$_2$O content of 5.0 to 20% by weight, wherein Me$_2$O represents an alkali-metal oxide selected from the group consisting of sodium oxide, potassium oxide and mixtures thereof, and (iii) as an additional co-reactant epoxy resin component, an epoxy resin which has a content of functional epoxy groups of 200 to 8000 nmol/kg and which reacts in the presence of heat produced by reactions involving the polyisocyanate and water to form organic polymeric structures containing oxazolidinone rings as structural elements.

14. Process according to claim 13 wherein the organomineral products are formed as solid, unfoamed products, with the components of the liquid reaction mixture being used in such amount of substance ratios that the following relationship is fulfilled:

wherein x(Me$_2$O) is the amount of substance in mol of an alkali-metal oxide selected from the group consisting of sodium oxide, potassium oxide and mixtures thereof in the alkali-metal silicate component, is the amount of substance in mol of the epoxy groups in the epoxy resin, (2x+y) (NCO) is the amount of substance in mol of the —NCO groups in the polyisocyanate component, and wherein Me stands for Na, K or mixtures thereof and x and y are positive numbers expressing the respective molar amounts which numbers have a tolerance width which allows for the normal quality variations in the individual components if these are used as commercial products of technical grade, and wherein the epoxy resin component is used in an amount which is from 0.01 to 60% by weight, based on the weight of the alkali-metal silicate component.

15. Process according to claim 14 wherein the polyisocyanate component comprises a polyisocyanate whose content of NCO groups is in the range from 0.238 to 1.190 mol per 100 g of polyisocyanate, wherein, further, as alkali-metal silicate component an aqueous alkali-metal silicate solution is used which is such that the content of Me$_2$O, with Me representing Na, K or mixtures thereof, is in the range from 0.081 to 0.323 mol per 100 g of alkali-metal silicate solution, and wherein as epoxy resin component an epoxy resin is used whose content of functional epoxy groups is in the range from 0.020 to 0.800 mol per 100 g of epoxy resin.

16. Process according to one of the claims 13 or 14, wherein as polyisocyanate component a chemically pure polyisocanate or a polyisocyanate of technical grade or a mixture of any such polyisocyanates with organic monoisocyanates is used, with the content of free NCO groups in the polyisocyanate component ranging from 10 to 50% by weight.

17. Process according to claim 16 wherein the content of free NCO groups in the polyisocyanate component ranges from 25 to 35% by weight.

18. Process according to one of the claims 13 or 14 wherein the reaction mixture further comprises a catalyst promoting the oxazolidinone formation.

19. Process according to claim 18 wherein the reaction mixture further comprises one or more components selected from the group consisting of stabilizers, fillers and mixtures thereof.

20. Process according to claim 18 wherein the catalyst is selected from catalysts based on tertiary amines, catalysts in form of organometallic compounds or catalysts in form of inorganic salts.

21. Process according to claim 18 wherein the catalyst is selected from the group consisting of benzyldimethylamine, 2,4,6-tris(dimethylaminomethyl)phenol, tetraethylammonium bromide, dioctyltin mercaptide, aluminum triisopropylate, aluminum trichloride, zinc dichloride and iron trichloride.

22. Process according to one of the claims 13 or 14 wherein the reaction mixture further comprises one or more components selected from the group consisting of stabilizers, fillers and mixtures thereof.

23. Process according to one of the claim 13 or 14 wherein the final reaction mixture is prepared by mixing the aqueous alkali-metal silicate solution and the epoxy resin to form a first premix component (component $A_1$), and by subsequently mixing the first premix component with a second premix component comprising the polyisocanate and, optionally, the catalyst.

24. Process according to one of the claim 13 or 14 wherein the final reaction mixture is prepared by mixing a first premix component comprising the aqueous alkali-metal silicate solution and, optionally, the catalyst (component $A_2$) with a second premix component (component B) comprising the polyisocyanate and the epoxy resin, with the epoxy resin being completely free of OH groups and obtained by reacting the epoxy resin in a preliminary reaction with a monoisocyanate at an amount corresponding to the stoichiometric amount of the OH groups in the epoxy resin.

* * * * *